(12) United States Patent
Kasturi et al.

(10) Patent No.: US 7,920,569 B1
(45) Date of Patent: Apr. 5, 2011

(54) MULTI-LINK TRANSPORT PROTOCOL TRANSLATION

(75) Inventors: Rohini Kasturi, Livermore, CA (US); Nitin Gugle, Cupertino, CA (US); Sravan Vadlakonda, Sunnyvale, CA (US); Steven A Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 156 days.

(21) Appl. No.: 12/115,058

(22) Filed: May 5, 2008

(51) Int. Cl.
*H04L 12/28* (2006.01)
*H04L 12/56* (2006.01)

(52) U.S. Cl. ........................................ 370/392
(58) Field of Classification Search ................ None
See application file for complete search history.

(56) References Cited

U.S. PATENT DOCUMENTS

| | | | |
|---|---|---|---|
| 5,425,028 A * | 6/1995 | Britton et al. ................ 370/389 |
| 5,805,824 A * | 9/1998 | Kappe ............................ 709/242 |
| 6,112,226 A * | 8/2000 | Weaver et al. ................ 709/203 |
| 6,359,896 B1 * | 3/2002 | Baker et al. .................... 370/410 |
| 6,757,255 B1 * | 6/2004 | Aoki et al. ..................... 370/252 |
| 7,028,051 B1 * | 4/2006 | McMullan et al. ........ 707/104.1 |
| 7,035,207 B2 * | 4/2006 | Winter et al. ................. 370/225 |
| 7,529,255 B2 * | 5/2009 | Zlateff et al. ................. 370/401 |
| 7,536,466 B2 * | 5/2009 | Yanamoto et al. ............ 709/230 |
| 2002/0087729 A1 * | 7/2002 | Edgar ............................ 709/246 |
| 2002/0169894 A1 * | 11/2002 | Takla ............................ 709/250 |
| 2004/0028009 A1 * | 2/2004 | Dorenbosch et al. ......... 370/329 |
| 2004/0165604 A1 * | 8/2004 | Oh et al. ........................ 370/401 |
| 2006/0002354 A1 * | 1/2006 | Kang et al. .................... 370/338 |
| 2006/0262783 A1 * | 11/2006 | Nedeltchev ................... 370/389 |
| 2007/0223379 A1 * | 9/2007 | Sivakumar et al. ........... 370/235 |
| 2008/0144663 A1 * | 6/2008 | Johnson et al. ............... 370/469 |
| 2009/0216880 A1 * | 8/2009 | Lepeska ........................ 709/224 |

* cited by examiner

*Primary Examiner* — Salman Ahmed
*Assistant Examiner* — Peter Chau
(74) *Attorney, Agent, or Firm* — Harrity & Harrity, LLP

(57) ABSTRACT

A device may receive a packet at a network device, and may retrieve from a table, by using information in a header of the packet as keys, records that include communication performance statistics associated with transport protocols. In addition, the device may select, based on the records, a transport protocol with an optimum communication performance statistics among the transport protocols and send the packet in accordance with the selected transport protocol from the network device.

20 Claims, 9 Drawing Sheets

US 7,920,569 B1

MULTI-LINK TRANSPORT PROTOCOL TRANSLATION

BACKGROUND

Typically, one endpoint of a communication link may send packets and/or messages to the other endpoint in accordance with communication protocols. The endpoints may enforce the protocols at different layers of communication.

SUMMARY

According to one aspect, a method may include receiving a packet at a network device and retrieving from a table, by using information in a header of the packet as keys, records that include communication performance statistics associated with transport protocols. In addition, the method may include selecting, based on the records, a transport protocol with an optimum communication performance statistics among the transport protocols and sending the packet in accordance with the selected transport protocol from the network device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements.

The term "packet," as used herein, may refer to a packet, datagram, cell; a fragment of a packet, datagram or cell; or other types or arrangements of data (e.g., a message).

As described below, a device may receive a packet, select a transport protocol for sending the packet, perform what is herein referred to as a "transport protocol translation" (e.g., substituting one transport protocol for another) on the packet, and send the packet. In selecting the transport protocol, the device may evaluate a number of different transport protocols based on communication performance statistics (e.g., packet latency, error rate, etc.). In sending the packet, the device may signal information related to the transport protocols to an adjacent upstream device that is to send the packet to the device.

Figure 1:
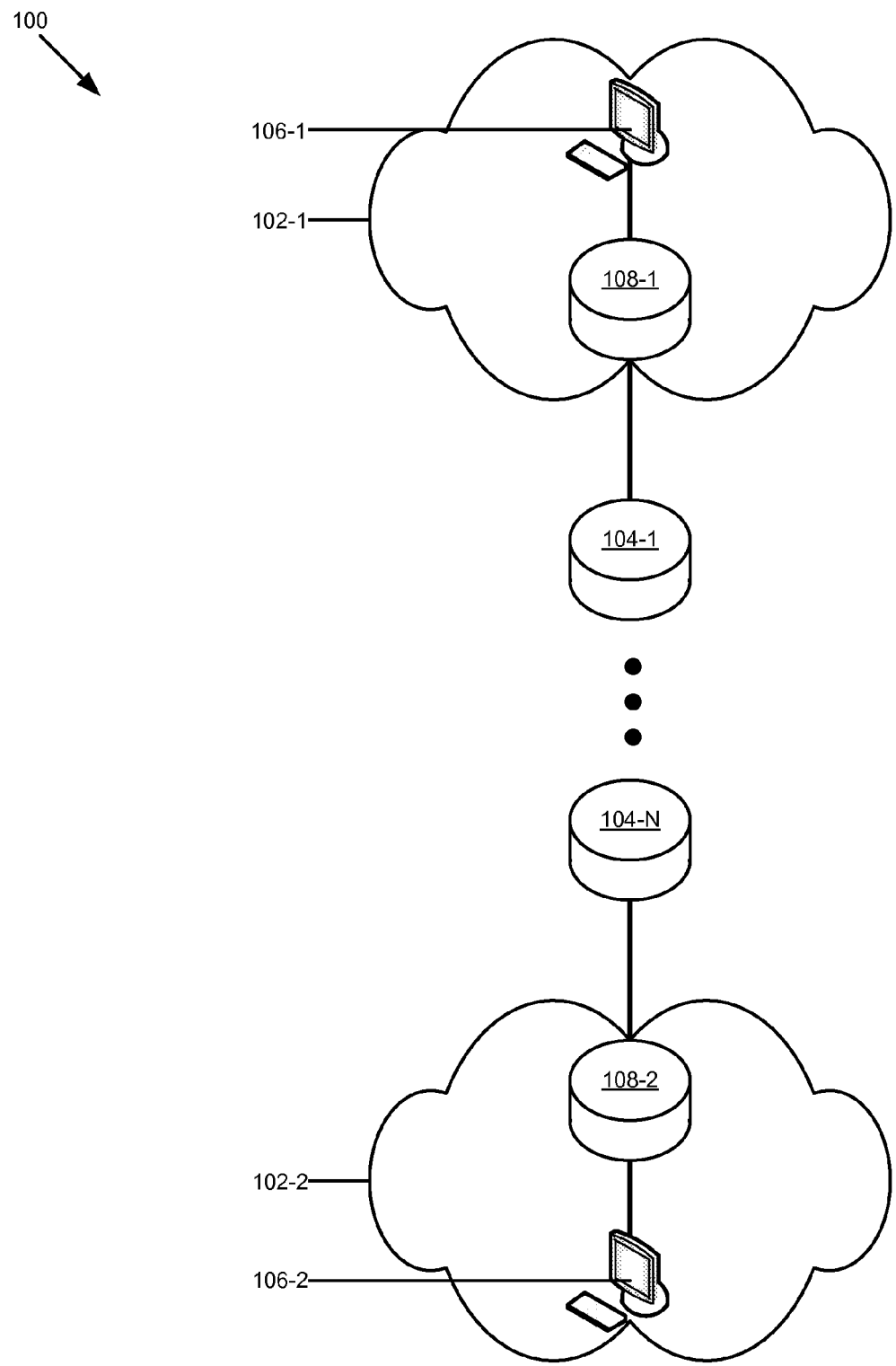
FIG. 1 is a diagram of an exemplary network in which concepts described herein may be implemented.

FIG. 1 is an exemplary network 100 in which concepts described herein may be implemented. As shown, network 100 may include networks 102-1 and 102-2 (herein collectively referred to as networks 102) and devices 104-1 through 104-N (herein collectively referred to as devices 104 and individually as device 104-x). Although not shown, network 100 may include additional networks, such the Internet, an intranet, an ad hoc network a local area network (LAN), a wide area network (WAN), a metropolitan area network (MAN), a cellular network, a wireless network (e.g., Wireless LAN), a public switched telephone network (PSTN), or a combination of networks.

Each of networks 102 may include a LAN, a MAN, a WAN, a cellular network, and/or any other network that may communicate with one or more other networks. Each of devices 104 may include a gateway, a switch, and/or a router that may relay packets from one device to another device. In relaying the packets, devices 104 may translate transport protocols of the packets. Although network 100 may include other types of devices, for the purpose of simplicity, they are not illustrated in FIG. 1.

As further shown in FIG. 1, network 102-1 may include a client endpoint 106-1 and a device 108-1 (e.g., an edge router, a gateway, a proxy server, a firewall, etc.). Network 102-1 may include additional devices that are interposed between client endpoint 106-1 and device 108-1, even though they are not illustrated in FIG. 1.

Client endpoint 106-1 may include a computing device, such as a workstation, a personal computer, a laptop, a personal digital assistant, an electronic notepad, a mobile telephone, and/or any other computing device that has the ability to or is adapted to communicate and interact with other devices in network 100.

Device 108-1 may relay packets that are received from devices inside/outside network 102-1 to devices outside/inside network 102-1. In relaying the packets, device 108-1 may translate network transport protocols of the relayed packets.

Network 102-2 may include a client endpoint 106-2, a device 108-2 (e.g., an edge router) and/or additional devices (not shown). Client endpoint 106-2 and device 108-2 may include similar devices as client endpoint 106-1 and device 108-1 and may operate similarly.

Exemplary Network Device Configuration

Figure 2:
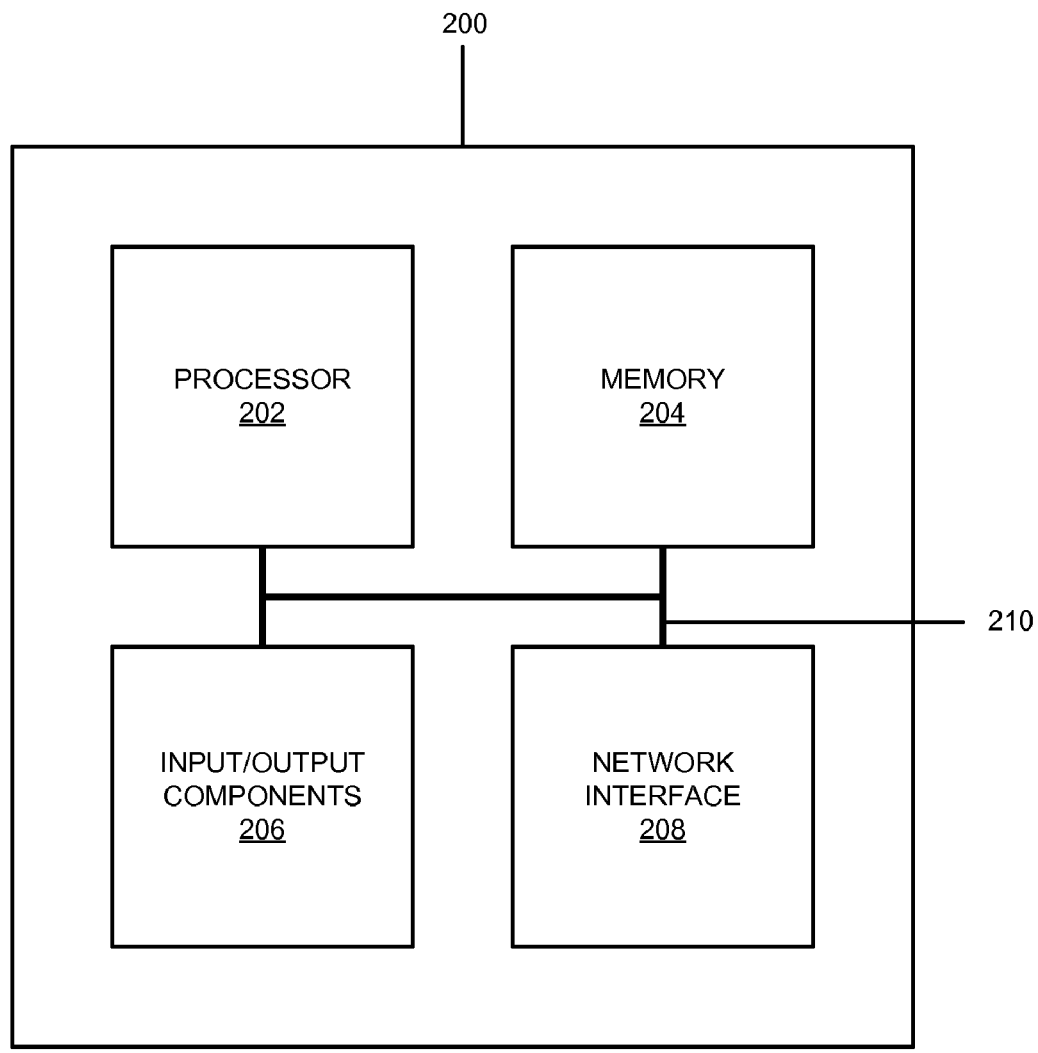
FIG. 2 is a block diagram of an exemplary device of FIG. 1.

FIG. 2 illustrates an exemplary network device 200. Network device 200 may represent any one of devices 104, client endpoints 106-1 and 106-2, and devices 108-1 and 108-2. As shown, network device 200 may include a processor 202, a memory 204, input/output components 206, a network interface 208, and a communication path 210. In different implementations, network device 200 may include additional, fewer, or different components than the ones illustrated in FIG. 2. For example, network device 200 may include additional network interfaces, such as line interfaces for receiving and forwarding packets.

Processor 202 may include a processor, a microprocessor, an Application Specific Integrated Circuit (ASIC), a Field Programmable Gate Array (FPGA), and/or other processing logic capable of controlling network device 200. Memory 204 may include static memory, such as read only memory (ROM), and/or dynamic memory, such as random access memory (RAM), or onboard cache, for storing data and machine-readable instructions. Memory 204 may also include storage devices, such as a floppy disk, CD ROM, CD read/write (R/W) disc, and/or flash memory, as well as other types of storage devices.

Input/output components 206 may include a display screen, a keyboard, a button, a light-emitting diode (LED), a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Network interface 208 may include any transceiver-like mechanism that enables network device 200 to communicate with other devices and/or systems. For example, network interface 208 may include mechanisms for communicating via a network, such as the Internet, a wireless network, a LAN, a MAN, a WAN, etc. Additionally or alternatively, network interface 208 may include a modem, an Ethernet interface to a LAN, a line card, and/or an interface/connection for connecting network device 200 to other devices.

Communication path 210 may provide an interface through which components of network device 200 can communicate with one another.

Figure 3:
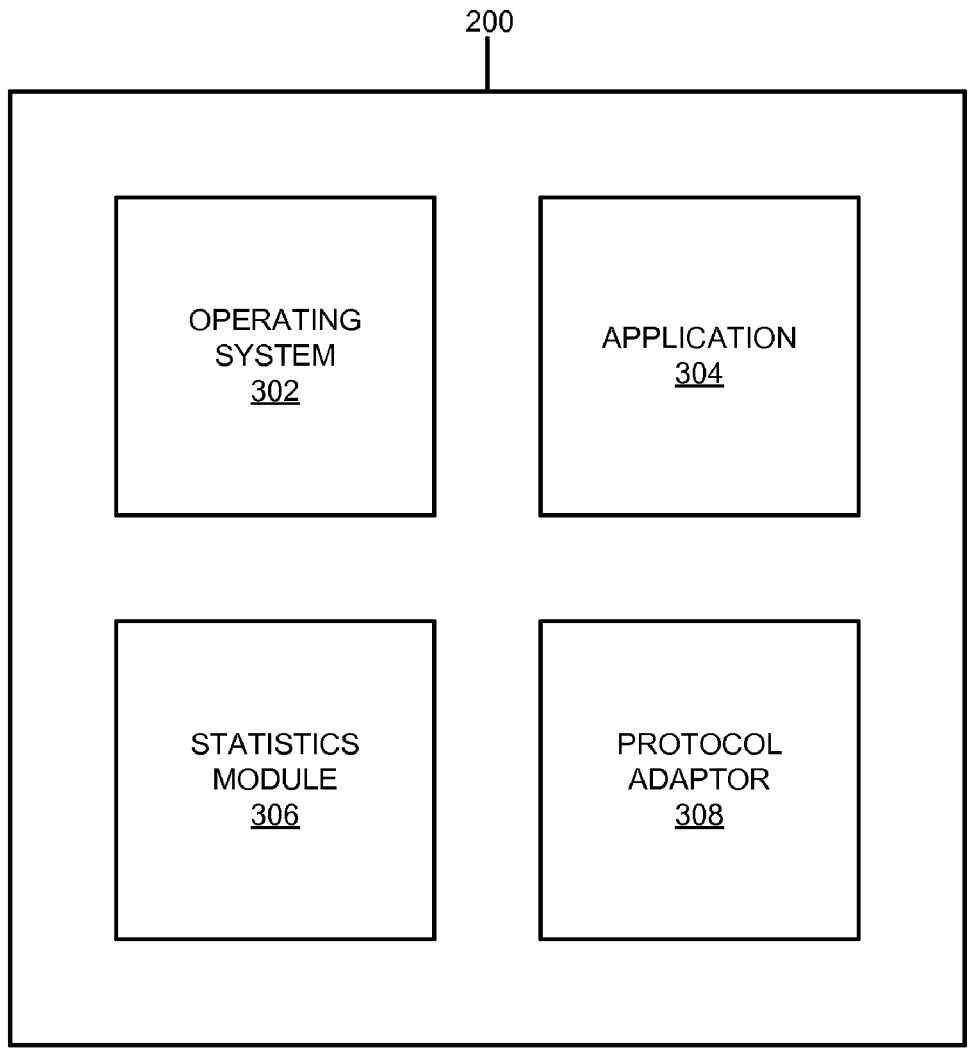
FIG. 3 is a functional block diagram of one implementation of the exemplary device of FIG. 2.

FIG. 3 is a functional block diagram of one implementation of exemplary network device 200. In this implementation, network device 200 may take the form of a server, a gateway, etc. As shown, network device 200 may include an operating system 302, an application 304, a statistics module 306, and a protocol adaptor 308.

Operating system 302 may manage resources (e.g., processing cycles, memory, etc.) of network device 200 and may provide support for other components of network device 200 (e.g., an application). For example, operating system 200 may provide a Transmission Control Protocol (TCP)/IP stack. Application 304 may perform a specific task and/or provide a service to a user (e.g., an email client service).

Statistics module 306 may collect statistics (e.g., communication performance statistics) of packets that network device 200 relays. In some implementations, statistics module 306 may obtain packet statistics for each of network interfaces (e.g., line interfaces) in network device 200. In other implementations, statistics module 306 may collect packet statistics that pertain to network device 200 as a whole (e.g., a total number of packets that are received at or sent by network device 200).

The packet statistics may include information, such as network latency, types of application-level protocols (e.g., the hypertext transfer protocol (HTTP), the file transfer protocol (FTP), telnet, etc.) with which the packets comply, an average length of the packets, deep inspection properties (e.g., packet parameters that are associated with layers 2-7 of Open System Interconnectivity (OSI) model of network communication), etc.

In one implementation, statistics module 306 may obtain packet statistics from a flow table included in statistics module 306. The flow table may provide statistics about a flow (e.g., a stream of packets from a source to a destination). In another implementation, statistics module 306 may obtain the packet statistics based on deep packet inspections. The deep packet inspections may involve obtaining samples of packets, correlating packets of a two-way conversation between two endpoints, identifying application-layer protocols for each of the packets, detecting potential security violations, error rates, etc.

Protocol adaptor 308 may update a transport protocol information table (TPIT), which will be described below in greater detail. In addition, protocol adaptor 308 may send the information in TPIT to other protocol adaptors in other devices in network 100 and consult a transport protocol translation table (TTPT) to translate transport protocols. The TTPT will be described below in greater detail, to translate transport protocols.

Figure 4:
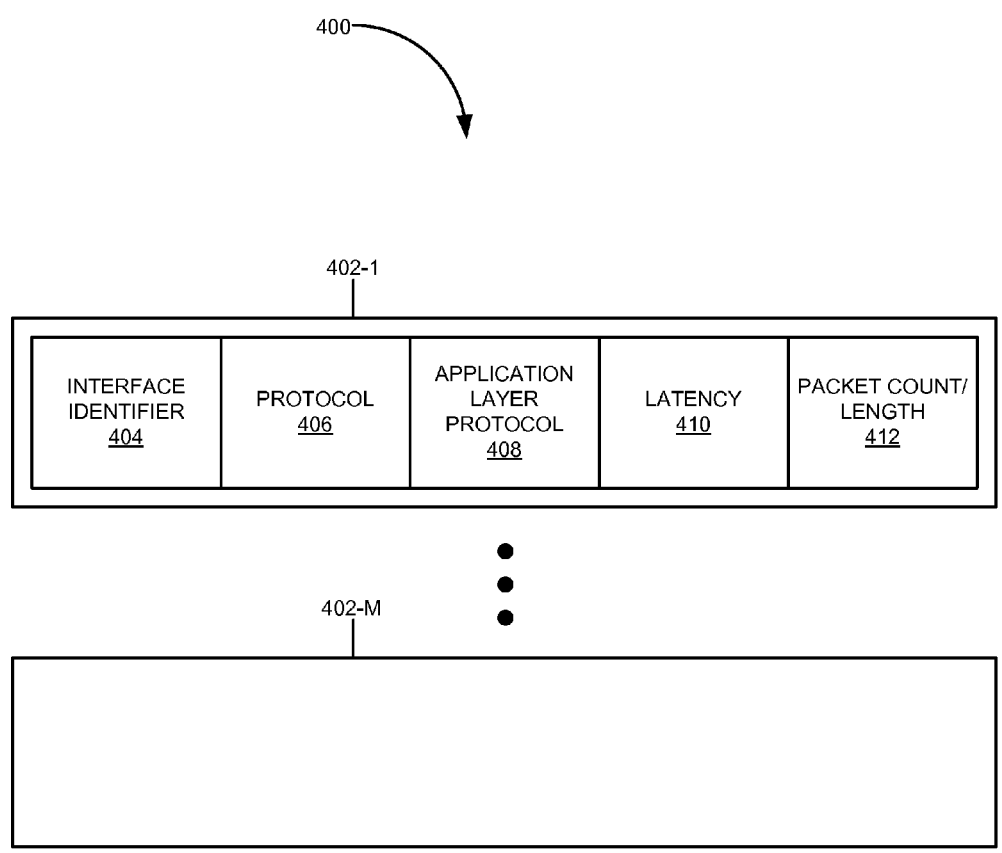
FIG. 4 is a block diagram of an exemplary transport protocol information table (TPIT)

FIG. 4 shows an exemplary TPIT 400. TPIT 400 may be included in one or more of the components in FIG. 2 and/or FIG. 3 (e.g., memory 204). As shown in FIG. 4, TPIT 400 may include records 402-1 through 402-M (hereinafter collectively referred to as records 402 and individually as record 402-$x$). As further shown, each record 402-$x$ may include an interface identifier field 404, a protocol field 406, an application-layer protocol field 408, a latency field 410, and a packet count/length field 412. Depending on the implementation, record 402-$x$ may include additional, fewer, or different fields than those illustrated in FIG. 4 (e.g., an error rate field, a bandwidth field, a desired or required quality-of-service (QoS) field, an overall latency of network 100 field, etc.).

Interface identifier field 404 may identify an interface (e.g., a line interface) where packets whose statistics are stored in record 402-$x$ are received/sent. Protocol field 406 may identify a transport protocol for which record 402-$x$ includes the packet statistics. Application-layer protocol field 408 may indicate an application-layer communication protocol under which the packets originate (e.g., the HTTP, the FTP, the telnet, etc.). Latency field 410 may indicate an average delay that is associated with conveying the packets from an upstream device in network 100 to network device 200. Packet count/length field 412 may indicate the number of packets/average lengths of packets that are received at the line interface from the upstream device.

In one implementation, protocol adaptor 308 may update TPIT 400 based on flow records (e.g., records about flows), deep packet inspection properties, and/or sampled packets (e.g., copies of the packets). For example, when protocol adaptor 308 receives a packet, protocol adaptor 308 may identify an interface at which the packet is received, and may obtain, from the packet's header, a transport protocol and an application-layer protocol. Furthermore, protocol adaptor 308 may locate record 402-$x$ based on an interface identifier (e.g., a line card number) associated with the identified interface, the transport protocol, and the application-layer protocol. Once record 402-$x$ is retrieved, protocol adaptor 308 may update latency field 410 or packet count/length field 412 with new values of latency, packet counts, and/or average packet lengths.

Protocol adaptor 308 may exchange information related to transport protocols (e.g., information in a TPIT) with other protocol adaptors in devices that are adjacent to network device 200 at the transport layer. In exchanging the information, protocol adaptor 308 may follow a specific signaling protocol. For example, assume that protocol adaptor 308 determines an average latency of packets that are routed from an upstream device to network device 200. In such a case, protocol adaptor 308 may signal (e.g., send) the average latency to the upstream device. The upstream device may use the latency information to select a transport protocol under which packets may be conveyed to network device 200 in the shortest amount of time.

Protocol adaptor 308 may consult a transport protocol translation table (TPTT) for translating transport protocols. A TPTT may include TPIT 400 that has been transferred from an adjacent downstream device. When protocol adaptor 308 receives a packet, protocol adaptor 308 may locate, within the TPTT, records 402 that match information in the packet's header, such as, for example, a length of the packet, an application-layer protocol, etc. Furthermore, among the matching records, protocol adaptor 308 may select record 402-x that optimally satisfies a set of criteria (e.g., a least latency, a fewest number of errors, etc.). Subsequently, protocol adaptor 308 may send the packet in accordance with a transport protocol that is indicated in protocol field 406 of selected record 402-x.

Figure 5A:
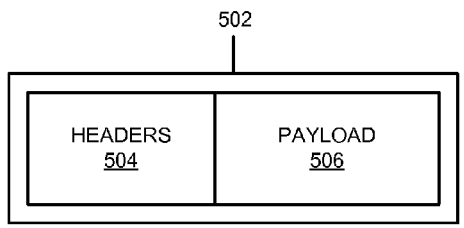
FIG. 5A is a block diagram of an exemplary packet.

Prior to sending the packet, protocol adaptor 308 may modify the packet in a number of different ways. FIG. 5A is a block diagram of a packet 502 before the packet is sent by protocol adaptor 308. As shown, packet 502 may include headers 504 and a payload 506. Headers 504 may include information about packet 502 (e.g., a source address, a destination address, a port number, a protocol, a length, etc.) at different layers of communication. Payload 506 may include packet data.

Figure 5B:
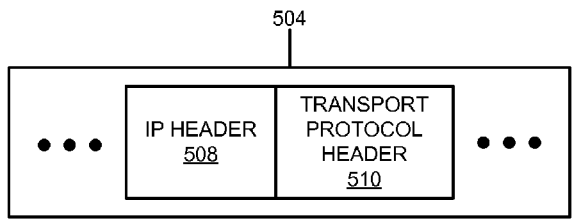
FIG. 5B is a block diagram of a header of the exemplary packet of FIG. 6A.

FIG. 5B is a block diagram of headers 504. As shown, headers 504 may include an IP header 508 and a transport protocol header 510. IP header 508 may include information that pertains to layer 3 of the OSI model (e.g., a source IP address, a destination IP address, etc.). Transport protocol header 510 may include information for layer 4 of the OSI model or layer 4 of the TCP/IP reference model of communication. Examples of information that may be included in transport protocol header 510 include a TCP header, a User Datagram Protocol (UDP) header, a Stream Control Transmission Protocol (SCTP) header, a Datagram Congestion Control Protocol (DCCP) header, etc.

Figure 5C:
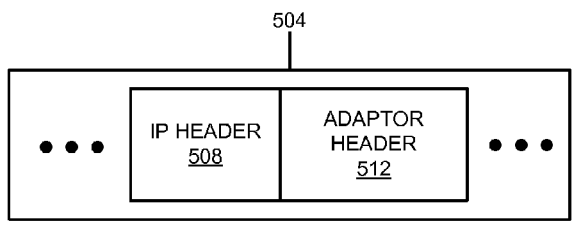
FIG. 5C is a block diagram of the header of FIG. 5B after a transport protocol header is replaced with an adaptor header.

In one implementation, before sending the packet, protocol adaptor 308 may modify the packet by replacing transport protocol header 510 with a header of its own, herein referred to as "adaptor header," to convey, to a downstream device, information related to transport protocol translation. FIG. 5C shows header 504 after protocol adaptor 308 replaces transport protocol header 510 with adaptor header 512. In one implementation, adaptor header 512 may include a header for a selected transport protocol under which the packet will be sent from network device 200 to the downstream device.

Figure 5D:
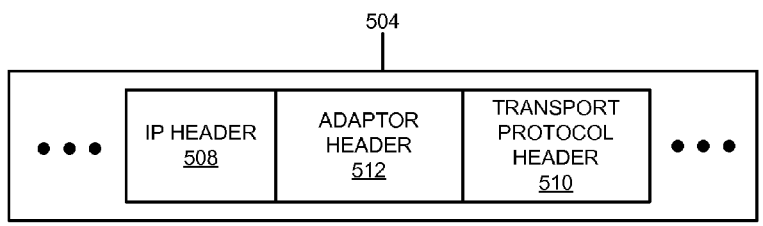
FIG. 5D is a block diagram of the header of FIG. 5B after an adaptor header is inserted between a transport protocol header and an Internet Protocol (IP) header.

In a different implementation, protocol adaptor 308 may insert an adaptor header between IP header 508 and transport protocol header 510. FIG. 5D shows header 504 after protocol adaptor 308 inserts adaptor header 512 in header 504. As in FIG. 5C, adaptor header 512 may include header 512 for the selected transport protocol. For example, assuming that protocol adaptor 308 selects the TCP, adaptor header 512 may include a TCP header.

In FIGS. 5C and 5D, depending on the specifics of how network device 200 exchanges information related to transport protocol translation with other devices in network 100, adaptor header 512 may or may not include information in addition to a header for the selected protocol, such as the time that adaptor header 512 is created, an identifier for adaptor header 512, etc. For example, in one implementation, assume that protocol adaptor 308 indicates to an adjacent downstream device that protocol adaptor 308 will insert adaptor header 512 between IP header 508 and transport protocol header 510 in packets that are to be sent to the downstream device. Based on the indication, when the downstream device receives a packet from protocol adaptor 308, the downstream device may correctly handle adaptor header 512 (e.g., remove adaptor header) in the packet even if adaptor header 512 is indistinguishable from a transport protocol header (e.g., a UDP header, a TCP header, etc.).

When network device 200 receives a packet that has been modified by protocol adaptor 308 within an upstream device, protocol adaptor 308 in network device 200 may replace an adaptor header that is present in the packet with its own adaptor header 512, or may remove the adaptor header.

Figure 6:
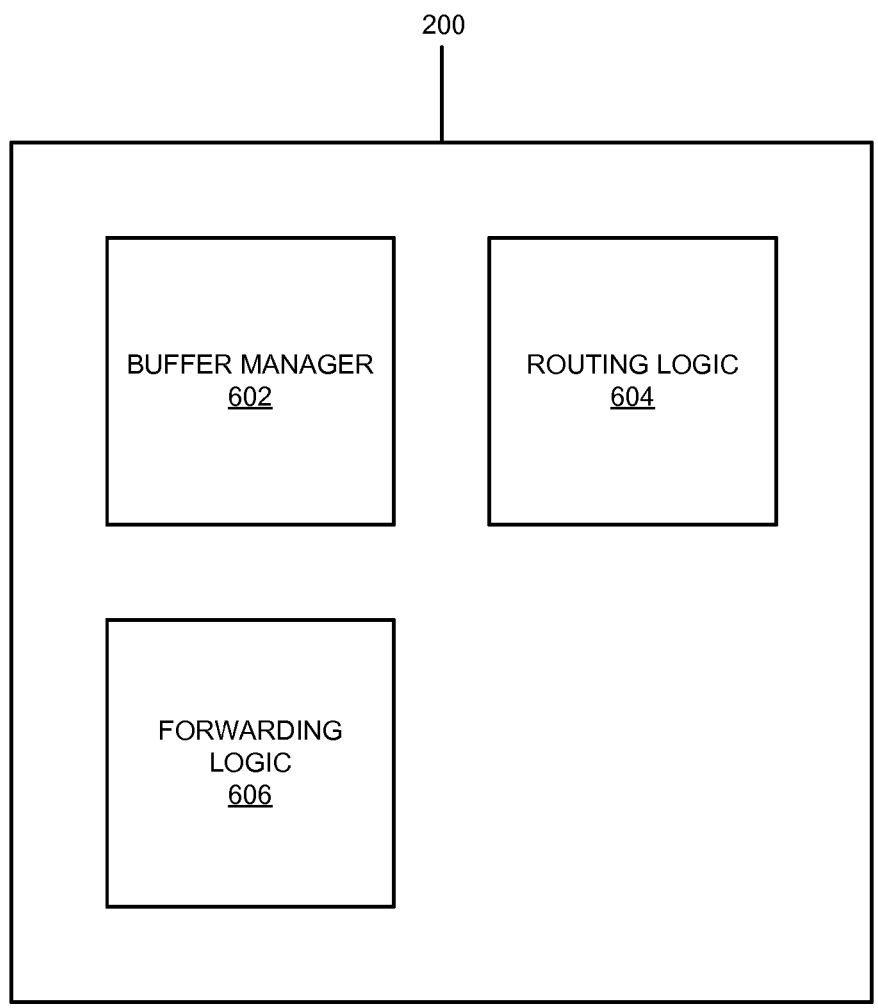
FIG. 6 is a functional block diagram of another implementation of the exemplary device of FIG. 2.

FIG. 6 is a functional block diagram of another implementation of exemplary network device 200. In the implementation, network device 200 may take the form of a router or a switch. As shown, network device 200 may include a buffer manager 602, routing logic 604, and forwarding logic 606. Depending on specifics of the implementation, network device 200 may include additional, fewer, or different components than the ones illustrated in FIG. 6.

Buffer manager 602 may provide a buffer for queuing incoming packets. If packets arrive simultaneously, one or more of the packets may be stored in the buffer until higher priority packets are processed and/or transmitted. Routing logic 604 may include hardware and/or software for communicating with routing logic of other devices to gather and store routing information in a routing information base (RIB). In one implementation, routing logic 604 may also include TPIT 400 and may provide functionalities for sending/receiving TPIT 400 or information that is included in TPIT 400 to another device in network 100. In some implementations, when routing logic 604 receives TPIT 400 or information in TPIT 400 from a downstream device, routing logic 604 may distribute the information to line interfaces in network device 200. Such mechanisms may improve transport protocol translation speed.

Forwarding logic 606 may include hardware and/or software for directing a packet to a proper output port on one of line interfaces (not shown) based on routing information. Forwarding logic 606 may be implemented on multiple components, such as network interfaces (e.g., line interfaces) in network device 200.

Figure 7:
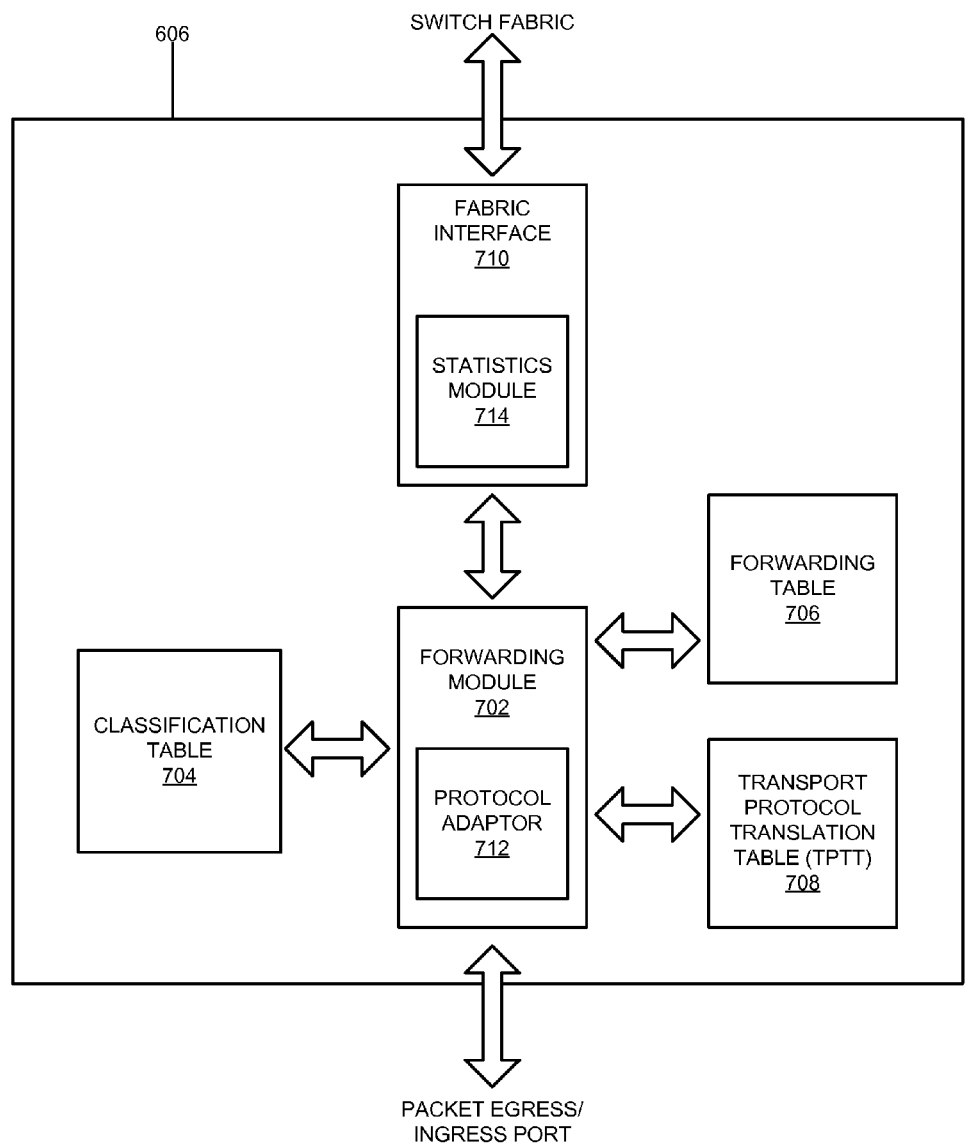
FIG. 7 is a functional block diagram of forwarding logic of FIG. 6.

FIG. 7 is a functional block diagram of forwarding logic 606 that may be implemented on a line interface. As shown, forwarding logic 606 may include a forwarding module 702, a classification table 704, a forwarding table 706, TPTT 708, and a fabric interface 710. Depending on the implementation, forwarding logic 606 may include fewer, additional, or different components than those illustrated in FIG. 7.

Forwarding module 702 may include hardware and/or software for forwarding and/or classifying a packet that is received at the line interface. When forwarding module 702 receives a packet, forwarding module 702 may perform a lookup of information related to the packet in classification table 704, process the packet based on the information, and forward the packet in accordance with information in forwarding table 706.

As further shown in FIG. 7, forwarding module 702 may include a protocol adaptor 712. Protocol adaptor 712 may be implemented similarly and operate similarly as protocol adaptor 308. In some implementations, however, protocol adaptor 400's ability to exchange TPIT information may be incorporated in routing logic 604 (FIG. 6) rather than in protocol adaptor 712.

Classification table 704 may include rules for categorizing a packet based on a packet header. Examples of classification rules may include rules for performing a firewall rule lookup (e.g., access control list (ACL) lookup) for performing a policy based routing (e.g., if a packet header indicates that the packet is a telephony packet, route the packet from X to Y via an asynchronous transfer mode (ATM) circuit), and for rendering differentiated quality of service (QoS). Forwarding table 706 may include information for identifying an egress line interface to forward an incoming packet to a device based on the packet's network destination address.

TPTT 708 may include similar fields and/or information as TPIT 400 or the TPTT that has been described above in connection with protocol adaptor 308 (FIG. 3). In some implementations, because TPTT 708 is located within a line interface, records in TPTT 708 may not include one or more fields in records 402, such as an interface identifier field 404.

Fabric interface 710 may include hardware and/or software for providing an interface to a switch fabric (not shown) that interconnects the line interfaces within network device 200. Fabric interface 710 may include one or more interfacing buffers (not shown) for temporarily storing packets from forwarding module 702. The buffers may prevent the packets from being dropped if a bottleneck (e.g., a processing delay) develops on a line interface-to-line interface path during packet transport.

As further shown in FIG. 7, fabric interface 710 may include a statistics module 714. Statistics module 714 may include similar functional components and may operate similarly as statistics module 306. Although FIG. 7 shows statistics module 714 as being included in fabric interface 710, in different implementations, statistics module 714 may be physically positioned in forwarding module 702 or elsewhere on a signal path between forwarding module 702 and fabric interface 710.

Exemplary Process for Translating Transport Protocols

Figure 8:
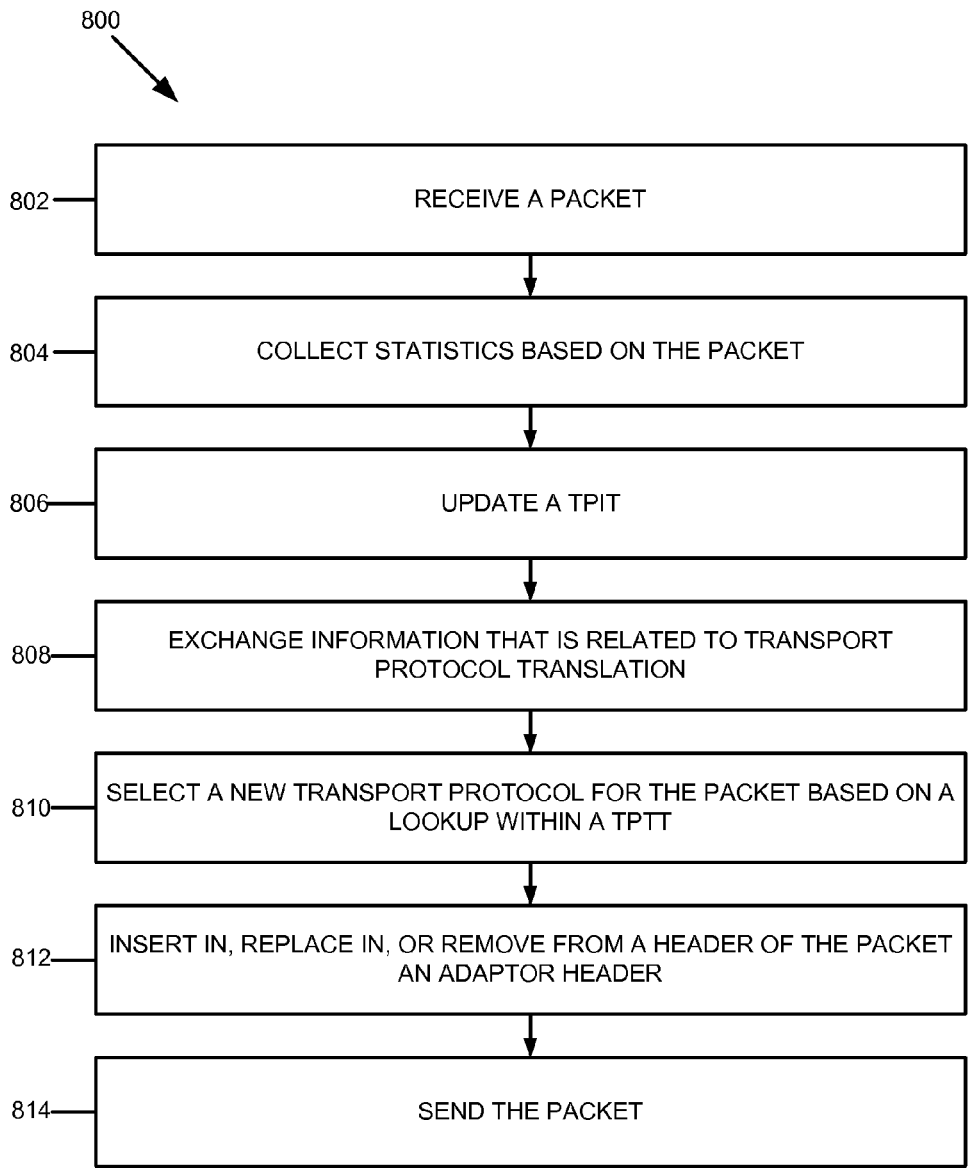
FIG. 8 is a flow chart of an exemplary process for translating transport protocols.

FIG. 8 is a flow chart of an exemplary process 800 for translating transport protocols. Depending on the implementation, process 800 may be performed by one or more components of network device 200.

As shown, process 800 may begin when a packet is received (block 902). In one implementation, network device 200 may receive the packet from an upstream, adjacent device (e.g., a router, gateway, or an endpoint).

Statistics may be collected based on the packet (block 804). Network device 200 may collect the statistics in a number of different ways. For example, statistics module 306 may obtain information about a flow to which the packet belongs (e.g., a number of packets that belong to the flow) from a flow table. In another example, statistics module 306 may identify an application-layer protocol (e.g., TCP, SCTP, UDP, etc.) of the packet from the packet's header. In still another example, statistics module 306 may obtain latency between an upstream device that sent the packet and network device 200 based on a time stamp included in adaptor header 512 and the time when the packet is received at network device 200. In yet another example, statistics module 306 may determine the length of payload 506 of the packet.

TPIT 400 may be updated (block 806). To update TPIT 400, protocol adaptor 308/712 may access record 402-x of TPIT 400 (FIG. 4) based the packet's transport protocol and/or packet's application-layer protocol. If protocol adaptor 308/712 is not implemented on a line interface, but on a centralized memory, an identifier associated with a line interface that receives the packet may also be useful for locating record 402-x. Subsequently, protocol adaptor 308/712 may update various fields in record 402-x, as described above with reference to TPIT 400.

For example, protocol adaptor 308/712 may update packet count/length field 412 in record 402-x. Assume that protocol adaptor 308/712 is implemented on a line interface, as shown in FIG. 7. In such an instance, protocol adaptor 308/712 may lookup, in the flow table in statistics module 714, a number of packets/bytes that have been sent by an upstream device under a specific transport protocol and at a particular port number. Based on information retrieved from the lookup, protocol adaptor 308/712 may determine a packet count and/or an average packet length to update packet count/length field 412.

In another example, protocol adaptor 308/712 may update latency field 410. To update latency field 410, protocol adaptor 308/712 may determine if the packet has been sent from an upstream device that includes a protocol adaptor, by determining whether protocol adaptor 308/712 has been signaled by a protocol adaptor in the upstream device. If the packet has been sent from an upstream device that includes the protocol adaptor, protocol adaptor 308/712 may examine adaptor header 512 to identify the time when adaptor header 512 in the packet was created in the upstream device. By comparing the time at which the packet is received at network device 200 to the time when adaptor 512 was created, protocol adaptor 308/712 may determine the latency associated with sending the packet from the upstream device to network device 200. The latency may be used to adjust the value of average latency that is stored in latency field 410.

Information that is related to transport protocol translation may be exchanged (block 808). For example, protocol adaptor 308/712 may send TPIT 400 or information included in TPIT 400 to an adjacent upstream device. If protocol adaptor 308/712 is located in processor 202/memory 204, rather than in a line interface, protocol adaptor 308/712 may send TPIT 400/information in TPIT 400 to each of the devices that are adjacent to each of line interfaces in network device 200.

Depending on the implementation, protocol adaptor 308/712 may send the TPIT periodically, based on a demand, or based on TPIT information from other devices in network 100. In addition, when network device 200 receives the TPIT information from one or more devices in network 100, protocol adaptor 308/712 may use the TPIT information to update a TPTT in network device 200 (e.g., TPTT 708).

A new transport protocol for the packet may be selected based on a lookup within the TPTT (block 810). For example, in one implementation, protocol adaptor 308/712 may access the TPTT and examine latencies for different protocols based on information included in the packet header (e.g., an application-layer protocol (e.g., HTTP, Simple Mail Transfer Protocol (SMTP), telnet, Post Office Protocol (POP), Real-time Transport Protocol (RTP), Session Initiation Protocol (SIP), Internet Message Access Protocol (IMAP), FTP, Gopher, Network News Transfer Protocol (NNTP), etc.), the length of payload 506, an overall latency of the network, and/or other information (e.g., QoS)). Subsequently, protocol adaptor 308/712 may dynamically select a transport protocol that optimally satisfies a set of criteria (e.g., the least latency, error rate, etc.).

In the above, one reason for selecting the transport protocol may be that the selected transport protocol may allow the packet to reach a next-hop device with superior performance statistics than the original transport protocol, depending on network traffic conditions, the size of payload 506 of the packet, and/or any other properties that are associated with network 100 or the packet. For example, a large packet under the SCTP may exhibit less latency than large packets under other transport protocols. A small FTP packet under the TCP may be communicated faster than similar packets under the SCTP or the UDP. A packet under the UDP may be conveyed quickly for medium-sized payloads (e.g., less than 1500 bytes).

Adaptor header 512 may be inserted in, replaced in, or removed from header 504 of the packet (block 812). Based on the specific transport protocol that is selected at block 810, protocol adaptor 308/712 may create adaptor header 512 that includes a header for the selected transport protocol. Furthermore, protocol adaptor 308/712 may insert adaptor header 512 in packet header 504. If the packet already includes an adaptor header, protocol adaptor 308/712 may replace the adaptor header in packet header 504 with adaptor header 512.

If the packet at network device 200 is one hop away from an endpoint (e.g., a client endpoint or a server endpoint), protocol adaptor 308/712 may remove adaptor header 512 from the packet.

Once packet header 502 is properly modified, the packet may be sent (block 814). For example, protocol adaptor 308/712 may send the packet to a device in network 100. The device may be similar to network device 200 (e.g., a gateway, a router, a switch, etc.) or an endpoint (e.g., a client endpoint or a server endpoint). The packet may be sent in accordance with adaptor header 512 or transport protocol of transport protocol header 510.

Example

Figure 9:
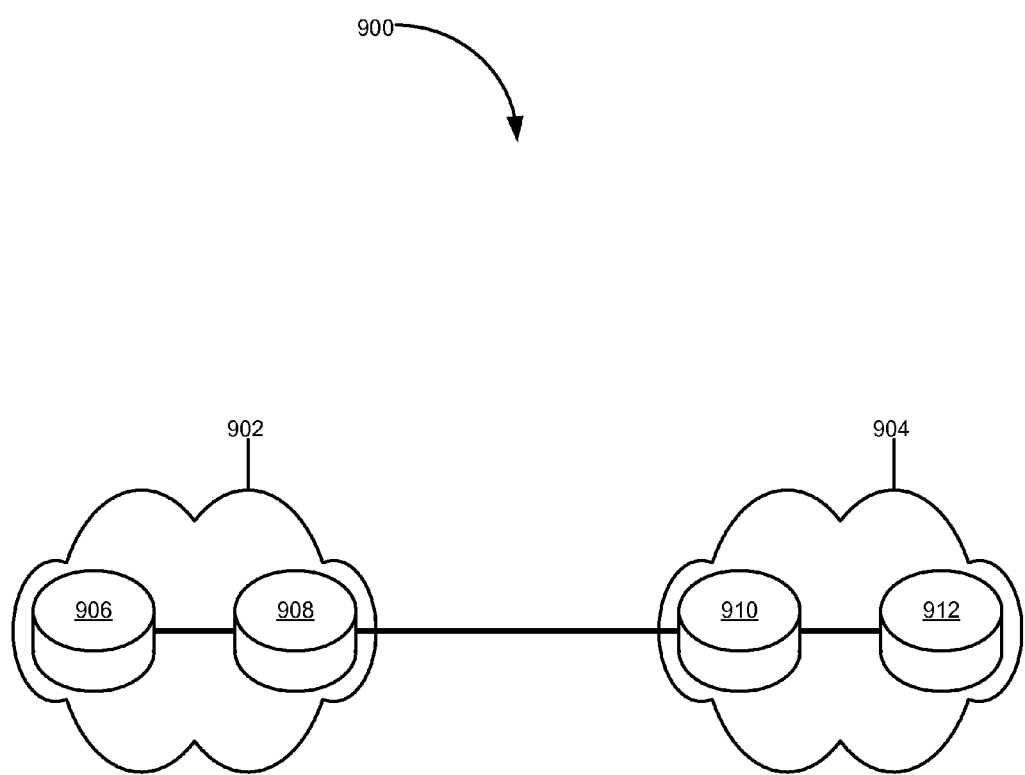
FIG. 9 is a block diagram of another network in which the concepts described herein may be implemented.

FIG. 9 illustrates an example for translating transport protocols. The example is consistent with exemplary process 800 described above with respect to FIG. 8.

Assume that network 900 includes LAN 902 and LAN 904, LAN 902 includes a personal computer 906 (e.g., a client endpoint) and an edge router 908, and LAN 904 includes an edge router 910 and a web server 912 (e.g., a server endpoint). In addition, assume that packets under the UDP are conveyed more optimally (e.g., less latency, fewer bit errors, etc.) than packets under other transport protocols when the packets are relayed from edge router 908 to edge router 910.

In the example, a user at personal computer 906 sends a HTTP packet over the TCP via a browser. The packet is transmitted to edge router 908. Protocol adaptor 712 in edge router 908 looks up records 402 in a TPTT based on a header of the packet, and selects the UDP as a transport protocol that is best for sending the packet to edge router 910. Based on the protocol selection, protocol adaptor 712 creates and inserts adaptor header 512 for the UDP in the packet header.

Edge router 910 receives the packet with adaptor header 512 from to edge router 908. Based on a prior exchange of information related to transport protocol translation between edge router 908 and edge router 910, protocol adaptor 712 in edge router 910 knows that the packet may include adaptor header 512.

Protocol adaptor 712 in edge router 910 uses the packet header to update TTIP 400. In particular, protocol adaptor 712 looks up a record 402-x that matches UDP protocol and the application-layer protocol (e.g., HTTP) and updates latency field 410 and packet count/length field 412 of record 402-x with new values of latency, packet counts, and average packet lengths. The new values of latency, packet counts, and average packet lengths may be determined based on statistics that are collected for the packet.

Edge router 912 removes adaptor header 512 from the packet header and relays the packet to web server 912.

Later, at a scheduled time, edge router 910 sends updated TPIT 400 to edge router 908. When edge router 908 receives TPIT 400, edge router 908 updates the TTPT.

Conclusion

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   sending, from a network device, a first packet to a downstream device, where the first packet is associated with a first transport protocol;
   receiving information from the downstream device, where the information includes one or more communication performance statistics associated with the first packet sent to the downstream device by the network device;
   updating, in a table that includes a plurality of records associating communication performance statistics with transport protocols, a particular record that associates communication performance statistics with the first transport protocol;
   receiving a second packet at the network device;
   retrieving, from the table, by using information in a header of the second packet as a key, records that include communication performance statistics associated with a plurality of transport protocols, where the retrieving is based on at least one of:
      a transport protocol associated with the second packet,
      an application-layer protocol associated with the second packet, or
      network latency;
   identifying a second particular record, from the retrieved records, that is associated with a second transport protocol that is different from the first transport protocol, where the second particular record indicates that the second transport protocol is associated with communication performance statistics that are preferred over the communication performance statistics associated with the first transport protocol;
   selecting, based on the records, the second transport protocol; and
   sending the second packet in accordance with the selected second transport protocol from the network device to the downstream device.

2. The method of claim 1, where the retrieving is further based on:
  deep packet inspection properties associated with the second packet.

3. The method of claim 1, where selecting, based on the records, the second transport protocol includes:
  selecting, among the transport protocols, a transport protocol with a least latency or a least error rate.

4. The method of claim 1, further comprising:
  creating an adaptor header that includes information in a transport protocol header of a packet under the selected second transport protocol, and
  one of:
    replacing a transport protocol header within the header of the received second packet with the created adaptor header; or
    replacing an existing adaptor header within the header of the received second packet with the created adaptor header.

5. The method of claim 1, where sending the second packet includes one of:
  inserting an adaptor header in the header of the second packet; or
  removing an adaptor header from within the header of the second packet.

6. The method of claim 1, further comprising:
  collecting statistics about one or more transport protocols associated with the second packet based on at least one of:
    deep packet inspection properties associated with the second packet, a network latency associated with the second packet, or an application-layer protocol of the second packet.

7. The method of claim 6, further comprising:
  sending the collected statistics to an upstream network device that is adjacent to the network device at a particular communication layer.

8. The method of claim 6, where collecting statistics includes:
  obtaining the statistics based on information in a flow table.

9. A network device, comprising:
  a memory to store:
    instructions, and
    a table that includes a plurality of records associating communication performance statistics with transport protocols; and
  one or more processors to execute the instructions to:
    send, from the network device, a first packet to a downstream device, where the first packet is associated with a first transport protocol;
    receive information from the downstream device, where the information includes one or more communication performance statistics associated with the first packet sent to the downstream device by the network device;
    update, in the table, a particular record that associates communication performance statistics with the first transport protocol;
    receive a second packet;
    retrieve, from the table, by using information in a header of the second packet as a key, records that include communication performance statistics associated with a plurality of transport protocols, where the retrieving is based on at least one of:
      a transport protocol associated with the second packet,
      an application-layer protocol associated with the second packet, or
      network latency;
    identify a second particular record, from the retrieved records, that is associated with a second transport protocol that is different from the first transport protocol, where the second particular record indicates that the second transport protocol is associated with communication performance statistics that are preferred over the communication performance statistics associated with the first transport protocol;
    select, based on the records, the second transport protocol; and
    send the second packet in accordance with the selected second transport protocol from the network device to the downstream device.

10. The network device of claim 9, where the retrieving is further based on:
  deep packet inspection properties associated with the second packet.

11. The network device of claim 9, where when selecting, based on the records, the second transport protocol, the one or more processors are to:
  select, among the transport protocols, a transport protocol with a least latency or a least error rate.

12. The network device of claim 9, where the one or more processors are further to:
  create an adaptor header that includes information in a transport protocol header of a packet under the selected second transport protocol, and
  one of:
    replace a transport protocol header within the header of the received second packet with the created adaptor header; or
    replace an existing adaptor header within the header of the received second packet with the created adaptor header.

13. The network device of claim 9, where when sending the second packet, the one or more processors are to:
  insert an adaptor header in the header of the second packet; or
  remove an adaptor header from within the header of the second packet.

14. The network device of claim 9, where the one or more processors are further to:
  collect statistics about one or more transport protocols associated with the second packet based on at least one of deep packet inspection properties associated with the second packet, a network latency associated with the second packet, or an application-layer protocol of the second packet.

15. A system comprising:
  means for sending, from a network device, a first packet to a downstream device, where the first packet is associated with a first transport protocol;
  means for receiving information from the downstream device, where the information includes one or more communication performance statistics associated with the first packet sent to the downstream device by the network device;
  means for updating, in a table that includes a plurality of records associating communication performance statistics with transport protocols, a particular record that associates communication performance statistics with the first transport protocol;
  means for receiving a second packet at the network device;
  means for retrieving, from the table, by using information in a header of the second packet as a key, records that include communication performance statistics associated with a plurality of transport protocols, where the retrieving is based on at least one of:
- a transport protocol associated with the second packet,
- an application-layer protocol associated with the second packet, or
- network latency;

means for identifying a second particular record, from the retrieved records, that is associated with a second transport protocol that is different from the first transport protocol, where the second particular record indicates that the second transport protocol is associated with communication performance statistics that are preferred over the communication performance statistics associated with the first transport protocol;

means for selecting, based on the records, the second transport protocol; and means for sending the second packet in accordance with the selected second transport protocol from the network device to the downstream device.

16. The system of claim 15, where the retrieving is further based on:
deep packet inspection properties associated with the second packet.

17. The system of claim 15, where the means for selecting, based on the records, the second transport protocol include:
means for selecting, among the transport protocols, a transport protocol with a least latency or a least error rate.

18. The system of claim 15, further comprising:
means for creating an adaptor header that includes information in a transport protocol header of a packet under the selected second transport protocol, and
one of:
- means for replacing a transport protocol header within the header of the received second packet with the created adaptor header; or
- means for replacing an existing adaptor header within the header of the received second packet with the created adaptor header.

19. The system of claim 15, where the means for sending the second packet include one of:
- means for inserting an adaptor header in the header of the second packet; or
- means for removing an adaptor header from within the header of the second packet.

20. The method of claim 15, further comprising:
means for collecting statistics about one or more transport protocols associated with the second packet based on at least one of deep packet inspection properties associated with the second packet, a network latency associated with the second packet, or an application-layer protocol of the second packet.

* * * * *